Nov. 11, 1947.   L. G. HOBART   2,430,677
CLAMP
Filed April 17, 1945   2 Sheets-Sheet 1
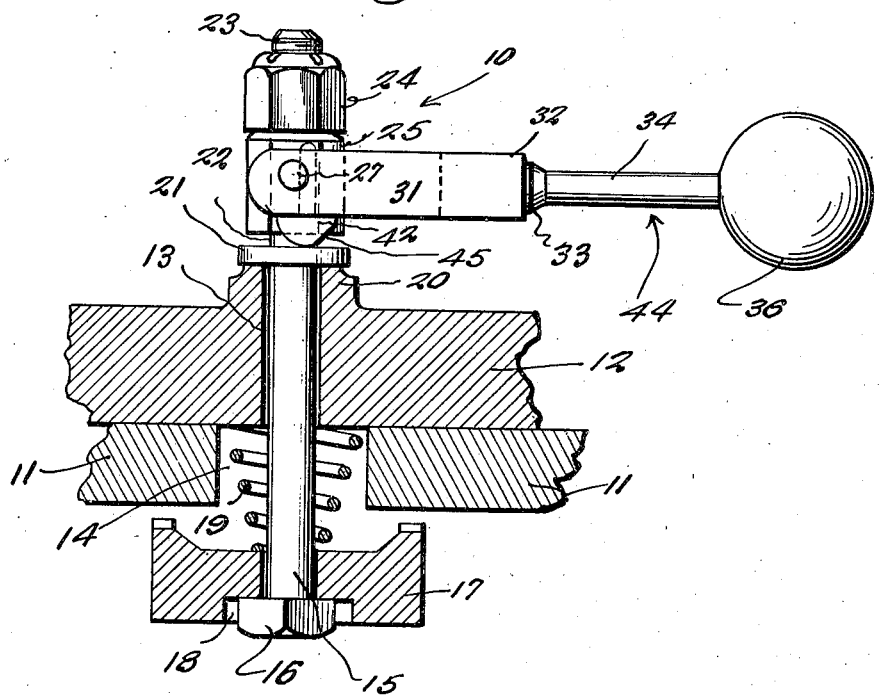
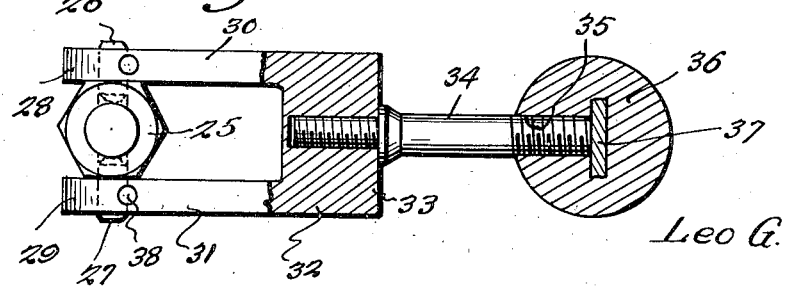
Inventor
Leo G. Hobart
By Clarence A. O'Brien
and Harvey B. Jacobson
Attorneys Nov. 11, 1947.　　　　L. G. HOBART　　　　2,430,677
CLAMP
Filed April 17, 1945　　　2 Sheets-Sheet 2
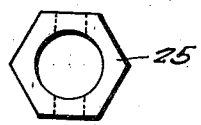
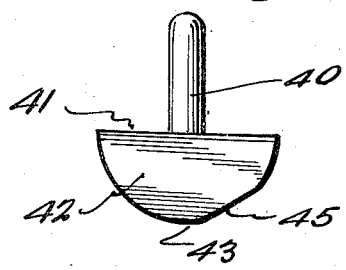
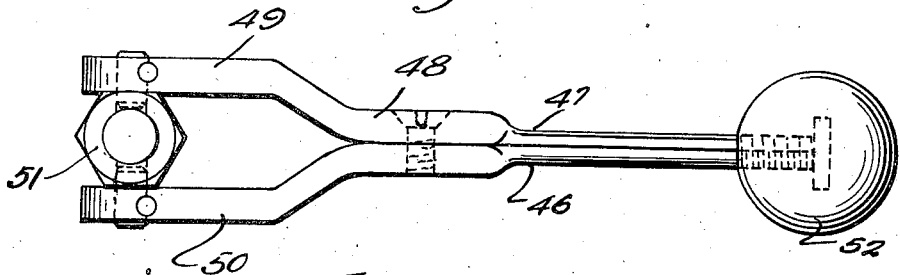
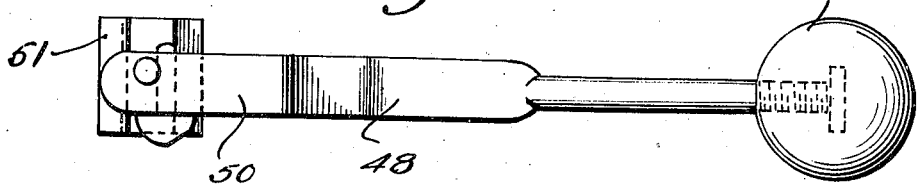
Leo G. Hobart, *Inventor*
By Clarence A. O'Brien
and Harvey B. Jacobson
*Attorneys*

Patented Nov. 11, 1947

2,430,677

UNITED STATES PATENT OFFICE 2,430,677

CLAMP

Leo G. Hobart, Los Angeles, Calif.

Application April 17, 1945, Serial No. 588,762

1 Claim. (Cl. 90—59)

This invention relates to clamping devices and has for its object to provide a quick acting clamp for lathe tail-stocks and other similar places where a positive and quick acting clamp may be required.

Another object of the invention is to provide a lever actuated clamp having an off center clamp actuating means.

A further object of the invention is to provide a clamp having a non-slipping clamp actuating device.

A still further object of the invention is to provide in a clamp detachable clamp actuating devices.

Other features and advantages will become more readily apparent from the following description and the accompanying illustrative drawings in which:

Figure 1 is a sectional elevational view of my clamp,

Figure 2 is a plan view thereof shown partly in section,

Figure 3 is a detail of a hex block,

Figure 4 is another view thereof,

Figure 5 is a plan view of a modified form of lever,

Figure 6 is an elevational view thereof, and

Figure 7 is an enlarged detail of a cam lobe.

In the accompanying drawings as above enumerated and in the following specification, like characters of reference indicate like parts throughout and in which 10, indicates my invention as applied to a lathe, for which it has been specially designed, however it is obvious that it may be used in connection with many other machines and devices in which a quick actuating clamp may be useful.

In Figure 1 of the drawings 11, is the bed of a lathe upon which the base 12, of a tail-stock seats, said bed and tail-stock being provided with aligning openings 13 and 14, respectively through which the draw bolt 15, projects. Seated upon the head 16, of said bolt is a clamp member 17, (the standard clamp as furnished by manufacturer on lathes) which member is provided with a recess 18, for said head. A coiled spring is loosely affixed around bolt 15, its purpose being to free clamp 17, readily from lathe bed when clamp is in inoperative position.

On the boss 20, of the tail-stock is seated a hardened washer 21, through which the upper end of bolt 15, projects. The terminal 23, of the bolt is screw-threaded to receive the self-locking adjustment nut 24, and mounted on the end 22, of the bolt, between said nut and washer is a tubular hex block 25, pivotally supported by the trunnions 26 and 27, which are fixed in the terminals 28 and 29, of the arms 30 and 31, of a bifurcated lever member 32, into the head 33, of which (on this design) is screw-threaded an extension handle 34, upon the terminal 35, of which is affixed a ball handle 36, for ease of operation. The member 32, is radially movable relative to member 15, and in no way affects the adjustment of clamp as this remains constant at any position due to the self-locking nut 24, and thus changing the adjustment previously set.

The arms 30 and 31, of lever member 32, are provided with bores 38 and 39, to receive the stems 40, projecting from the flat surfaces 41, of the inserted and interchangeable cam lobes 42, the apices 43, of which normally rests upon the washer 21, when the lever 44, is in horizontal (inoperative) position; however, when the lever is pressed down to its lowermost, that is, its clamping position, the small flattened surfaces 45, seat flat upon said washer 21, whereby it is impossible for clamp to move by vibration or other accidental causes.

The construction and off center location of the cam lobes 42 is of the utmost importance with this invention.

The drawing depicts a semi-spherical cam but other shapes may also be used depending upon the nature of the work. To explain: If a very quick opening and closing action is required a lobe of practically a triangular shape would be substituted, or if a progressive or "squeezing" action is required a plain semi-spherical lobe can be inserted. The degree of holding power applied is at all times governed by the amount nut 24, is screwed up or down, and herein lies a very valuable feature of my invention.

These cam lobes may be readily changed and the discretion of the user as to the type best suited to the job on hand is thus satisfied; simply raising the lever 44, to vertical position permits readily changing lobes, be it on account of wear, or for a different shape. Lobes 42 cannot turn at any time due to their close proximity to flat sides of hex 25. Another important feature of the members 42 is operative contact point 45, when in operative position, is concentric with the vertical axis of bolt 15, although the member itself is normally off-center relative to said axis.

The clamping position of the conventional cam requires excessive angular motion in whatever direction applied. This extra movement is not always available due to restricted operating conditions. It is also a waste of motion. With my off-center method I get twice the lifting action with only a very small downward movement of operating handle. This decreased operating space is a very desirable feature when considered over a period of time, as in lathe work. Herein lie my basic claims. This off-center construction together with the ease of replacing all vital parts subject to wear, and the ease of adjusting the degree of holding power required, constitute the main features of my invention.

For light drilling, turning, etc., the operating handle can be adjusted by screwing on nut 24, so that a mere flip of handle down will secure tail-stock. On heavier work the holding power may be increased by further screwing down on nut 24. Adjustments will of course then remain permanent throughout successive clampings, until the adjustment is again changed by further adjusting.

If desired (for any reason) tail-stock may be operated in the conventional manner (that is by the wrench) by merely leaving clamp in operating position and using wrench as though clamp was not installed.

In Figures 5 and 6, I show a variation of the bifurcated lever, in which two longitudinal members 46 and 47, are secured together at 48, from which point they diverge outwardly to form the spaced arms 49 and 50, between the terminals of which the hex block 25 is held. The terminals of members 46 and 47 are further secured by insertion into ball handle.

Numerous manufacturing designs may be used but all will conform in general to the ones herein shown. By such, I mean the body may be of a build up construction, cast, drop-forged, etc., without affecting basic claims. No generalities being used as to type of ball, that is plastic or metal, or means of securing being used.

While the operation of my clamp as described is obvious, it may be stated, however, that when the lever 44 is pressed down to its lowest position the member 42, which at all times closes the gap between the lever and the washer 21, and seating on said washer forms a fulcrum upon which the lever acts to raise the hex block 25, against the lock-nut 24, and forces the nut together with the bolt 15, and clamp member 17, into operative clamping position relative to the tail-stock 12, or other member being clamped.

Having now described my invention that which I claim as new and desire to procure by Letters Patent is:

A clamp including a draw bolt slidably disposed through aligned apertures in two members for securing the members in fixed position with respect to each other when said clamp is actuated, a coil spring disposed about said draw bolt between said members, said draw bolt having a head on one end engageable with an outer surface of one of said members and its opposite threaded end extending beyond the outer surface of the other member, a hardened washer slidably disposed upon said draw bolt engageable with the outer surface of said last-mentioned member, a tubular hex block slidably disposed upon said draw bolt between said hardened washer and the threaded end of said draw bolt, formed with a transversely aligned trunnion supporting bores and with intersecting vertical bores, a C-shaped clamp actuating member having parallel arms formed with transversely aligned bores formed therethrough, an operating handle detachably supported on said clamp actuating member, oppositely disposed trunnions extending through the aligned bores in said hex block and the parallel arms of said C-shaped clamp actuating member, and cam lobes engageable with said hardened washer having integrally formed stems disposed in said vertical bores through the parallel arms of said clamp actuating members for keying engagement with said trunnions for preventing rotation thereof, and lock nuts adjustably disposed upon the threaded end of said draw bolt.

LEO G. HOBART.

REFERENCES CITED

The following references are of record in the file of this patent:

UNITED STATES PATENTS

| Number | Name | Date |
| --- | --- | --- |
| 63,929 | Morse | Apr. 16, 1864 |
| 97,986 | Slowe | Dec. 14, 1869 |
| 319,748 | Rein | June 9, 1885 |
| 1,297,539 | Bull | Mar. 18, 1919 |
| 1,676,289 | Schmalz | July 10, 1928 |
| 1,812,452 | Shaw | June 30, 1931 |
| 2,043,125 | Stahl | June 2, 1936 |
| 2,325,387 | Fredrickson | July 27, 1943 |